United States Patent
Dowd et al.

(10) Patent No.: US 7,073,196 B1
(45) Date of Patent: *Jul. 4, 2006

(54) FIREWALL FOR PROCESSING A CONNECTIONLESS NETWORK PACKET

(75) Inventors: Patrick W. Dowd, Columbia, MD (US); John T. McHenry, Odenton, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/287,654

(22) Filed: Apr. 7, 1999

Related U.S. Application Data (60) Provisional application No. 60/095,647, filed on Aug. 7, 1998.

(51) Int. Cl.
*G06F 11/30* (2006.01)
*G06F 15/16* (2006.01)
*H04L 12/56* (2006.01)

(52) U.S. Cl. .................... 726/14; 370/395.52; 726/4; 709/223

(58) Field of Classification Search ............... 713/200, 713/201; 709/223–225, 230, 231, 238, 245; 370/389, 392, 393, 395.52, 395.5, 395.1, 370/400, 401
See application file for complete search history.

(56) References Cited

U.S. PATENT DOCUMENTS

| | | | |
|---|---|---|---|
| 5,606,668 A | | 2/1997 | Shwed |
| 5,623,601 A | | 4/1997 | Vu |
| 5,802,320 A | | 9/1998 | Baehr et al. |
| 5,826,014 A | * | 10/1998 | Coley et al. ................ 713/201 |
| 5,828,833 A | | 10/1998 | Belville et al. |
| 5,828,844 A | | 10/1998 | Civanlar et al. |
| 5,828,846 A | | 10/1998 | Kirby et al. |
| 5,835,726 A | | 11/1998 | Shwed et al. |
| 5,835,727 A | | 11/1998 | Wong et al. |
| 5,842,040 A | | 11/1998 | Hughes et al. |
| 6,092,110 A | * | 7/2000 | Maria et al. ................ 709/225 |
| 6,141,755 A | * | 10/2000 | Dowd et al. ................ 713/200 |

(Continued)

OTHER PUBLICATIONS

Decasper et al, "Crossbow: A Toolkit for Integrated Services of Cell Switched IPv#" 1997, http://216.239.100/search?q=cache:3v . . . ernhardPlattner-2.ps.gz+&hl=enm&ie=UTF-8, p. 1-10.*

(Continued)

*Primary Examiner*—Christopher Revak
(74) *Attorney, Agent, or Firm*—Robert D. Morelli

(57) ABSTRACT

The present invention is a device for and method of accessing a network by initializing a database, an approved list, and a disapproved list; receiving an connectionless network packet; computing a flow tag based on the connectionless network packet; discarding the connectionless network packet and returning to the second step if the flow tag is on the disapproved list; allowing access to the network and returning to the second step if the flow tag is on the approved list; comparing the flow tag to the database if the flow tag is not on the approved list or the disapproved list; discarding the connectionless network packet, adding the flow tag to the disapproved list, and returning to the second step if the database rejects the flow tag; and allowing access to the network, adding the flow tag to the approved list, and returning to the second step if the database accepts the flow tag.

26 Claims, 5 Drawing Sheets

U.S. PATENT DOCUMENTS

| | | | |
|---|---|---|---|
| 6,226,267 B1 * | 5/2001 | Spinney et al. | 370/235 |
| 6,426,943 B1 * | 7/2002 | Spinney et al. | 370/235 |
| 6,430,184 B1 * | 8/2002 | Robins et al. | 370/392 |

OTHER PUBLICATIONS

Boswell et al, "Support for Heterogeneous Communications Infrastructures in the HLA RTI" 1999, http:..dss.II.mit.edu/dss.web/99s-SIW-105.html, p. 1-13.*

"Is IPv6 in trouble? An analysis of IPv6 solutions to IPv6 features", p. 1-15.*

Fryer et al, "Microsoft Press Computer Dictionary" 1997, Microsoft Press, 3rd Edition, p. 196-197.*

"Merriam Webster's Collegiate Dictionary" 1997, Merriam-Webster, Incorporated, 10th Edition, p. 1023-1024.*

"An FPGA-Based Coprocessor for ATM Firewalls", IEEE Computer Society, Los Alamitos, CA, Apr. 16, 1997, Proceedings, The 5th Annual IEEE Symposium on Field-Programmable Custom Computing Machines, John T. McHenry, Patrick W. Dowd, et al. pp. 30-39.

* cited by examiner

FIREWALL FOR PROCESSING A CONNECTIONLESS NETWORK PACKET

This application claims the benefit of U.S. Provisional Application No. 60/095,647, filed Aug. 7, 1998.

FIELD OF THE INVENTION

The present invention relates, in general, to information processing system organization and, in particular, to input and output data processing flow controlling.

BACKGROUND OF THE INVENTION

A firewall is a device for, or method of, controlling the connectivity of one computer network to another. A firewall is commonly referred to as a packet filter or a gateway and is used, mainly, to provide security for a computer network. For example, a user may wish to have a private computer network be remotely accessible from a public computer network by certain users (e.g., employees) but not by others (e.g., hackers). Here, a firewall may be placed between the private computer network and the public computer network to allow only authorized users to access the private computer network from the public network.

An example of a public computer network is the Internet. Communication over the Internet is conducted using certain protocols. These protocols allow users with different computers and different operating systems to communicate with each other over the Internet. Typical Internet protocols include the Transmission Control Protocol (TCP) and the Internet Protocol (IP). Other Internet-compatible protocols are based on TCP and IP.

In IP, a data stream to be transmitted is divided into a number of packets, where each packet contains the same IP header information. A source address and a destination address of the data stream are added to each packet along with instructions on how to recombine the packets to obtain the original data stream. The source address identifies from where in the network the packet came while the destination address identifies to where in the network the packet is to be sent (i.e., the endpoint, or collection of endpoints, of the data stream). A series of packets, each identified by the same source address and the same destination addresses is commonly referred to as a flow. With these addresses, there is no need for the packet to take the same route to the destination address. By allowing the packets to travel different routes, the sudden unavailability of a transmission path over which previously transmitted packets travelled will not result in an incomplete transmission. Here, subsequently transmitted packets would be sent over a different available transmission path. Since IP does not require data to be sent over a single fixed connection, a network that employs IP is commonly referred to as a connectionless network. A goal of a connectionless network is to increase the probability that a data stream will reach its destination address, but there is a performance penalty (e.g., transmission time, latency, variance of delay, etc.) associated with the additional information added to each packet. To satisfy the need for higher performance, a communication protocol named Asynchronous Transmission Mode (ATM) was developed.

In ATM, communication takes place in two steps. In the first step is to establish a transmission path over which a data stream will be transmitted. Since the data stream will be sent over the established transmission path, ATM is commonly referred to as a connection-oriented network. A signal containing a request to establish a transmission path is transmitted in segments, where each segment is referred to as an ATM cell and, more particularly, as an ATM signalling segment. The transmitted segments are reassembled at the destination address to reconstruct the connection request. the connection request is then analyzed to determine whether or not to establish the transmission path.

If the transmission path is established, the second step is to transmit the data stream. The data stream is transmitted in segments, where each segment is also be referred to as an ATM cell but, more particularly, as an ATM data segment. The transmitted ATM data segments are then recombined at the destination address to for the original data stream.

A transmission path may include more than one node or link. For each link in the transmission path there must be two switches, one for the data stream to enter the link and one for the data stream to exit the link. In ATM, information must be maintained that identifies all of the links and switches that comprise the transmission path used to transmit a data stream. Instead of storing all of this information at one location, portions of the information are distributed throughout the network switches along the transmission path.

Information is added to the header of each segment to determine how to forward the cell to the next point, or hop, in the path to the destination address. The header for a segment has only edge-level significance (i.e., hop-to-hop), not end-to-end significance (i.e., source-to-destination). The header does not identify the source or the destination of the segment, but only provides enough information for the segment to be processed at the next hop in the path. Information that identifies the final destination of each segment is not included in the header, since all of the segments transmitted along a given transmission path follow the same route. For this reason, the headers in connectionless networks (i.e., IP) tend to be larger than headers in connection-oriented networks (i.e., ATM). The smaller header sizes of the connection-oriented networks make it easier for the switches to process the information. Therefore, connection-oriented networks tend to be more efficient and support higher transmission speeds than connectionless networks.

Some networks combine IP and ATM by transmitting IP packets over an ATM transmission channel. This is commonly referred to as IP over ATM. Here, an IP packet is divided into segments. Each segment is then made part of an ATM data segment and transmitted over the ATM network as an ATM cell.

Simply combining the capabilities of an ATM firewall with those of an IP firewall does not, necessarily, yield a more efficient or more secure firewall for an IP over ATM network. The present invention is a secure and efficient firewall that applies a security posture to connectionless network data packets (e.g., IP data packets) transmitted over a connection-oriented network (e.g., ATM).

The closest prior art to the present invention appears to be the present inventor's own previous work published in a paper entitled "An FPGA-Based Coprocessor for ATM Firewalls," by the IEEE Computer Society, Los Alamitos, Calif., on Apr. 16, 1997, in *Proceedings, The 5th Annual IEEE Symposium on Field-Programmable Custom Computing Machines*. The device disclosed in this publication is the subject of a patent application Ser. No. 09/059,041, filed Apr. 13, 1998, entitled "FIREWALL SECURITY APPARATUS FOR HIGH-SPEED CIRCUIT SWITCHED NETWORKS."

Figure 1:
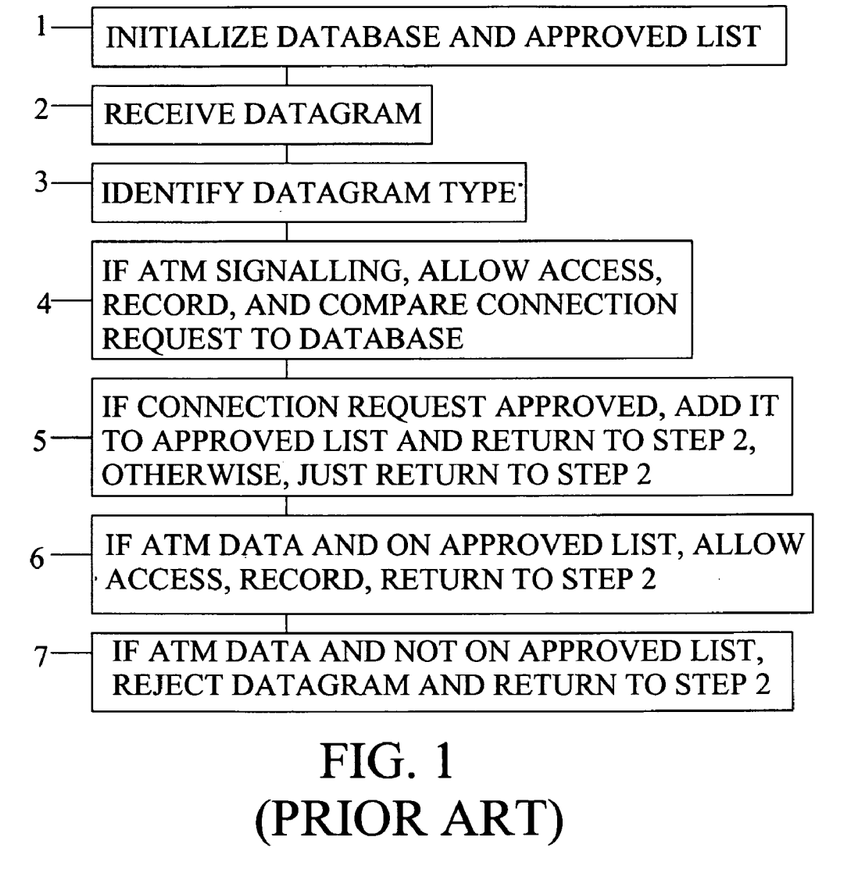
FIG. 1 is a list of the steps of a prior art method.

FIG. 1 lists the steps of the method disclosed in the above-identified publication. The first step 1 is initializing a database and a connection-oriented network approved list, where the database contains rules for allowing and denying access concerning connection-oriented network flows, and where the connection-oriented approved list includes approvals of flows carrying ATM signaling information and ATM data.

The next step 2 is receiving a datagram. The present invention uses the term datagram to mean a unit of information. Acceptable units of information for the method of FIG. 1 includes an ATM signaling segment or an ATM data segment.

The next step 3 is identifying the type of the datagram (i.e., ATM signaling segment or ATM data segment).

The next step 4 is allowing the datagram access to the information processing network, recording that the datagram was allowed access to the information processing network, and comparing the connection request contained therein to the database if the datagram is an ATM signaling segment.

The next step 5 is adding the connection request to the connection-oriented network approved list if the connection request is approved by the database and returning to the second step 2. If the connection request is not approved by the database then return to the second step 2 without recording anything on the approved list.

The next step 6 is allowing the datagram access to the information processing network, recording that the datagram was allowed access to the information processing network, and returning to the second step 2 if the datagram is an ATM data segment and is on the connection-oriented network approved list.

The next step 7 is discarding the datagram, recording that the datagram was denied access to the information processing network, and returning to the second step 2 if the datagram is an ATM data segment and is not on the connection-oriented network approved list.

Figure 2:
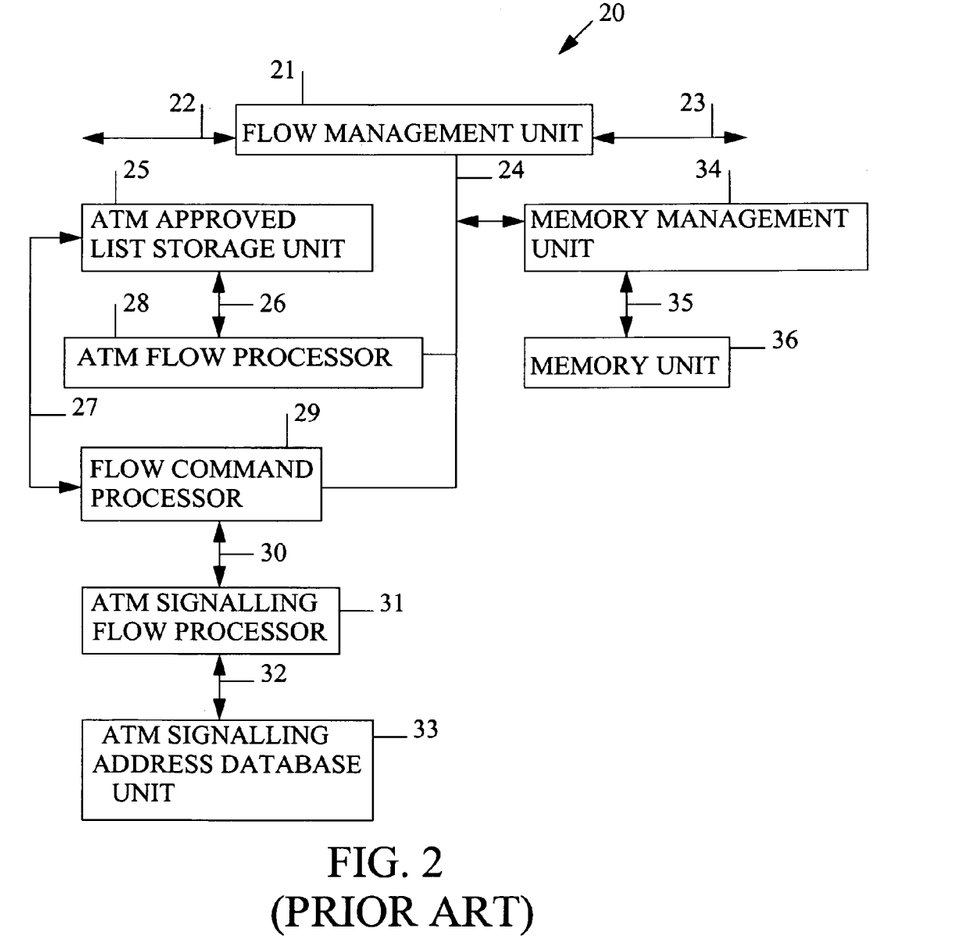
FIG. 2 is a schematic of a prior art device.

FIG. 2 is a schematic of a device 20 that implements the method disclosed in the above-identified publication. The device 20 includes a flow management unit 21, having a first input/output bus 22 for receiving a flow, having a second input/output bus 23 for transmitting a flow, and having a third input/output bus 24. A connection-oriented approved list storage unit 25 has a first input/output bus 26 and a second input/output bus 27. A connection-oriented flow processor 28 is connected to the input/output bus 26 of the connection-oriented approved list storage unit 25 and is connected to the third input/output bus 24 of the flow management unit 21. A flow command processor 29 is connected to the first input bus 27 of the connection-oriented approved list storage unit 25, is connected to the third input/output bus 24 of the flow management unit 21, and has an input/output bus 30. A connection-oriented (e.g., ATM) signaling flow processor 31 is connected to the input/output bus 30 of the flow command processor 29 and has an input/output bus 32. A connection-oriented signaling address database unit 33 is connected to the input/output bus 32 of the connection-oriented signaling flow processor 31. A memory management unit 34 is connected to the third input/output bus 24 of the flow management unit 21 and has an input/output bus 35. A memory unit 36 is connected to the input/output bus 35 of the memory management unit 34.

The method and device disclosed in the above-identified publication are each a firewall that only processes connection-oriented signaling segments and connection-oriented data segments. The inventors of the present invention improved upon their work by inventing a device and method that processes connectionless network segments (e.g., IP packet segments) contained within connection-oriented network cells (e.g., ATM cells).

Other prior art that may be relevant to the present invention includes the following U.S. patents.

U.S. Pat. No. 5,606,668, entitled "SYSTEM FOR SECURING INBOUND AND OUTBOUND DATA PACKET FLOW IN A COMPUTER NETWORK," discloses a device for and method of using a packet filter code that contains rules for determining whether or not a received packet should be allowed or denied access to the computer network. U.S. Pat. No. 5,606,668 requires that each packet received in all cases must be processed in accordance with the accept/reject rules. The present invention does not require that each packet received in all cases be analyzed in accordance with accept/reject rules. The processing burden required for each packet received makes the device and method of U.S. Pat. No. 5,606,668 not as efficient or secure as the device and method of the present invention. U.S. Pat. No. 5,606,668 is hereby incorporated by reference into the specification of the present invention.

U.S. Pat. No. 5,623,601, entitled "APPARATUS AND METHOD FOR PROVIDING A SECURE GATEWAY FOR COMMUNICATION AND DATA EXCHANGES BETWEEN NETWORKS," discloses a device for and method of screening data in accordance to the level of security required for the data. U.S. Pat. No. 5,623,601 requires an analysis of all of the received data in accordance with a security profile established by a security administrator. The processing burden required for each datagram received makes the device and method of U.S. Pat. No. 5,623,601 not as efficient and secure as the device and method of the present invention. U.S. Pat. No. 5,623,601 is hereby incorporated by reference into the specification of the present invention.

U.S. Pat. No. 5,802,320, entitled "SYSTEM FOR PACKET FILTERING OF DATA PACKETS AT A COMPUTER NETWORK INTERFACE," discloses a device for and method of screening data without adding any information of any network address pertaining to the screening process. This allows the screening system to function without being identified and, thus, more difficult to target by a hacker. U.S. Pat. No. 5,802,320 requires that each packet received be analyzed in accordance with accept/reject rules whereas the present invention does not. The processing burden required for each packet received makes the device and method of U.S. Pat. No. 5,802,320 not as efficient and secure as the device and method of the present invention. U.S. Pat. No. 5,802,320 is hereby incorporated by reference into the specification of the present invention.

U.S. Pat. No. 5,826,014, entitled "FIREWALL SYSTEM FOR PROTECTING NETWORK ELEMENTS CONNECTED TO A PUBLIC NETWORK," discloses a device for and method of a firewall. U.S. Pat. No. 5,826,014 requires that each datagram received be analyzed in accordance with accept/reject rules whereas the present invention does not. The processing burden required for each datagram received makes the device and method of U.S. Pat. No. 5,826,014 not as efficient and secure as the device and method of the present invention. U.S. Pat. No. 5,826,014 is hereby incorporated by reference into the specification of the present invention.

U.S. Pat. No. 5,828,844, entitled "INTERNET NCP OVER ATM," discloses a device for and method of a transmitting an IP data packet, ATM signaling, or ATM data. U.S. Pat. No. 5,828,844 does not disclose an efficient and hacker resistant firewall for receiving IP data packets, ATM signaling, and ATM data as does the present invention. U.S. Pat. No. 5,828,844 is hereby incorporated by reference into the specification of the present invention.

U.S. Pat. No. 5,828,833, entitled "METHOD AND SYSTEM FOR ALLOWING REMOTE PROCEDURE CALLS THROUGH A NETWORK FIREWALL," discloses a device for and method of allowing remote procedure calls through a firewall if the application server from which the request was made appears on an access control list. The access control list appears to be manually maintained. There does not appear to be any rules for automatically adding an application server to the access control list based on an analysis of the incoming request as in the present invention. U.S. Pat. No. 5,828,833 is hereby incorporated by reference into the specification of the present invention.

U.S. Pat. No. 5,828,846, entitled "CONTROLLING PASSAGE OF PACKETS OR MESSAGES VIA A VIRTUAL CONNECTION OR FLOW," discloses a method of a firewall that applies the accept/reject rules to every packet received that concerns flow management (i.e., signaling rather than data) whereas the present invention does not. The processing burden required for each packet received concerning connectivity makes the method of U.S. Pat. No. 5,828,846 not as efficient and secure as the device and method of the present invention. U.S. Pat. No. 5,828,846 is hereby incorporated by reference into the specification of the present invention.

U.S. Pat. No. 5,835,726, entitled "SYSTEM FOR SECURING THE FLOW OF AND SELECTIVELY MODIFYING PACKETS IN A COMPUTER NETWORK," discloses a device for and a method of a firewall that applies the accept/reject rules to every packet received whereas the present invention does not. The processing burden required for each packet received makes the device and method of U.S. Pat. No. 5,835,726 not as efficient and secure as the device and method of the present invention. U.S. Pat. No. 5,835,726 is hereby incorporated by reference into the specification of the present invention.

U.S. Pat. No. 5,835,727, entitled "METHOD AND APPARATUS FOR CONTROLLING ACCESS TO SERVICES WITHIN A COMPUTER NETWORK," discloses a device for and a method of a firewall that applies the accept/reject rules to every datagram received whereas the present invention does not. The processing burden required for each datagram received makes the device and method of U.S. Pat. No. 5,835,727 not as efficient and secure as the device and method of the present invention. U.S. Pat. No. 5,835,727 is hereby incorporated by reference into the specification of the present invention.

SUMMARY OF THE INVENTION

It is an object of the present invention to allow a connectionless network packet access to an information processing network, where the connectionless network packet is compared only once, if at all, to a database containing rules for allowing access.

It is another object of the present invention to allow a connectionless network packet access to an information processing network, where the connectionless network packet is compared only once, if at all, to a database containing rules for allowing access, and where each allowance or denial of access is recorded.

It is another object of the present invention to allow a connectionless network packet access to an information processing network, where the connectionless network packet is compared only once, if at all, to a database containing rules for allowing access, where each allowance or denial of access is recorded, and where a system administrator is alerted if the number of denials for a particular connectionless network packet exceeds a user-definable threshold or exceeds a user-definable threshold within a user-definable span of time.

The present invention is a device for and method of accessing an information processing network so that a connectionless network packet that is associated with a particular connectionless network flow that is not already pre-approved or pre-disapproved is compared only once to the rules for acceptance or rejection. The present invention makes an access control determination on the first occurrence of a new connectionless network flow. The connectionless network packet of the new flow initiates the evaluation process. The result of this evaluation is then applied to subsequently received connectionless network packets that are associated with the flow of the evaluated connectionless network packet without having to initiate the evaluation process again. Since much computation time is taken up with an exhaustive comparison of a new connectionless network packet against the rules for acceptance or rejection, only having to do this comparison the first time a connectionless network packet having a given set of connectionless network header information is encountered results in a maximally efficient firewall.

The first step is initializing a database, an approved list, and a disapproved list.

The second step is receiving a connectionless network packet.

The third step is computing a flow tag based on the connectionless network packet.

The fourth step is discarding the connectionless network packet and returning to the second step if the flow tag is on the disapproved list.

The fifth step is allowing the connectionless network packet access to the information processing network and returning to the second step if the flow tag is on the approved list.

The sixth step is comparing the flow tag to the database if the flow tag is not on the approved list or the disapproved list.

The seventh step of the method is discarding the connectionless network packet, adding the flow tag to the disapproved list, and returning to the second step if the database rejects the flow tag.

The eighth, and last, step is allowing the connectionless network packet access to the information processing network, adding the flow tag to the approved list, and returning to the second step if the database accepts the flow tag.

The firewall of the present invention minimizes the amount of processing time spent on a subsequently received connectionless network packet if its flow tag was previously approved or rejected as evidenced by the flow tag being on the approved list or the disapproved list. Therefore, additional processing time need not be wasted comparing the flow tag to the database rules again. No other firewall is known that performs this "one-touch" approach on a connectionless network packet. The result is fast approvals for approved connectionless network packets and fast disapprovals for disapproved connectionless network packets. Comparison time is only spent on those connectionless network packets having a flow tag that was never encountered before (i.e., the first connectionless network packet of a new flow). Minimizing the time to approve or disapprove a connectionless network packet increases the performance of a firewall and decreases the cost to manufacture such a firewall.

The method of the present invention may include a step of recording all allowances of access to the information processing network and recording all discarded connectionless network packets.

The device of the present invention that implements the method described above includes a flow management unit; a first connectionless network flow processor; an approved list storage unit; a disapproved list storage unit; a flow command processor; a second connectionless network flow processor; a connectionless network address database unit; a memory management unit; and a memory unit.

DETAILED DESCRIPTION

For clarity, the present invention will be described using IP as the connectionless network, but any connectionless network is intended to be included within the scope of the present invention. Wherever IP is used below, connectionless network or any specific connectionless network may be inserted therefor.

In the present invention, the term flow is used to denote a sequence of IP packets which make up a unit of information to be transmitted.

Figure 3:
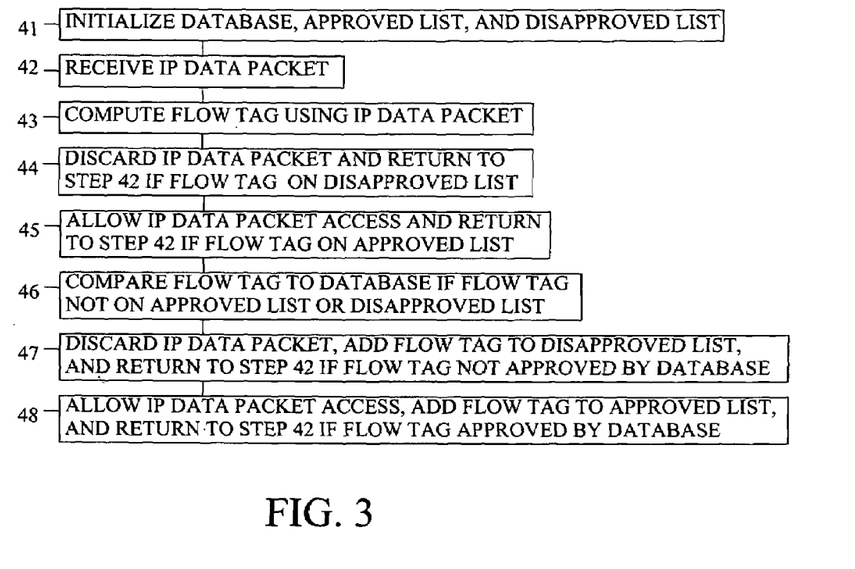
FIG. 3 is a list of steps of the present method.

The present invention is a device for and method of accessing an information processing network so that an IP packet received that is not already pre-approved or pre-disapproved is compared only once to the rules for acceptance or rejection. Since much computation time is taken up with an exhaustive comparison of a new IP packet against the rules for acceptance or rejection, only having to do this comparison the first time a particular IP packet of a flow is encountered results in a maximally efficient firewall. FIG. 3 lists the steps of the method of the present invention.

The first step 41 of the method is initializing a database, an approved list, and a disapproved list. The database contains rules for allowing and denying access concerning IP flows. The approved list includes approvals of IP flows. The disapproval list includes disapprovals of IP flows.

The second step 42 of the method is receiving an IP packet.

The third step 43 of the method is computing a flow tag based on the IP packet. The flow tag facilitates a fast comparison of the datagram received to the approved list and the disapproved list. The flow tag also minimizes the amount of information that must be stored to do a comparison. Exactly how the flow tag is computed and used is described below.

The fourth step 44 of the method is discarding the IP packet and returning to the second step 42 if the flow tag is on the disapproved list. The least amount of processing time is spent on the data if it is disapproved.

The fifth step 45 of the method is allowing the IP packet access to the information processing network and returning to the second step 42 if the flow tag is on the approved list. If the IP packet is approved then it is allowed access to the information processing network as quickly as possible.

The sixth step 46 of the method is comparing the flow tag to the database if the flow tag is not on the approved list or the disapproved list. If the firewall receives an IP packet with a given set of IP header information for the first time, it must compare the IP packet to the rules for acceptance or rejection contained in the database.

The seventh step 47 of the method is discarding the IP packet, adding the flow tag to the disapproved list, and returning to the second step 42 if the database rejects the flow tag. After the firewall of the present invention analyzes an IP packet with a given flow tag for the first time, it need not do so again. If the IP packet is rejected then its flow tag is added to the disapproved list to insure that additional processing time is not wasted on subsequently received IP packets that have the same flow tag.

The eighth, and last, step 48 of the method is allowing the IP packet access to the information processing network, adding the flow tag to the approved list, and returning to the second step 42 if the database accepts the flow tag. Again, the firewall of the present invention minimizes the amount of processing time spent on a subsequently received IP packet if the flow tag of that IP packet was previously approved as evidenced by the flow tag being present on the approved list. Therefore, additional processing time need not be wasted comparing the flow tag to the database rules again. No other firewall is known that performs this "one-touch" approach on an IP data packet.

The method of the present invention may include a step of recording all allowances of access to the information processing network and recording all discarded IP packets. Such a recording may be reviewed by the system administrator on a regular basis to determine the number and source of legitimate requests for access and the number and source of inappropriate requests for access. If the number of illegitimate, or legitimate, requests for access exceed a user-definable threshold or a user-definable threshold within a user-definable span of time, the firewall may record such an occurrence or take the proactive step of alerting the system administrator of such an occurrence so that corrective action may be taken as soon as possible.

Figure 4:
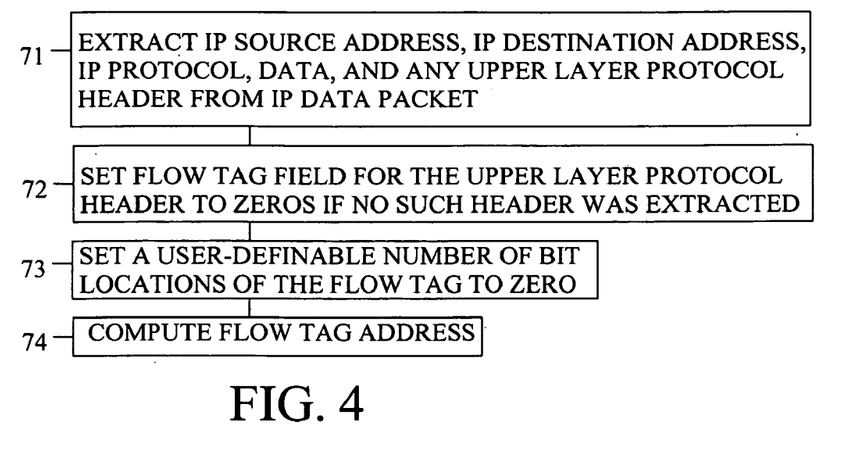
FIG. 4 is a list of the steps for computing a flow tag.

FIG. 4 lists one method of computing a flow tag for an IP packet. Other methods are possible. For example, information concerning the type of service requested and information from the payload portion of the IP packet may be included in the flow tag calculation. So, the present invention is not limited to the specific flow tag calculation described below.

The first step 71 is extracting an IP source address, an IP destination address, an IP protocol field, and an upper layer protocol header (e.g., TCP), if any, from the IP packet.

The second step 72 is assuming that the upper layer protocol header is all zeros if none was extracted from the IP packet. This simplifies the hardware that implements the present method by creating flow tags of uniform length even if some IP packets do not include an upper layer protocol header.

The third step 73 is setting certain user-definable bit locations of the extracted data, that may include an all-zero upper layer protocol header, each to zero. This step implements the security policy that the user wishes to employ by setting to zero, or masking, those bits in the IP packet that are of no interest to the user. For example, the user may not be interested in the IP source address when the IP packet is requesting access to a web page located on the information processing network but may be interested in the IP destination address to make sure that the destination is the web server on which the web page is located. The extracted and masked information is the flow tag for the IP packet.

The IP protocol field and the TCP port uniquely identify the type of service that the IP packet is attempting to perform (e.g., telnet, web browser, ftp, etc.). The IP protocol field is used to determine which bits in the extracted information should be masked.

The fourth step 74 is to compute a flow tag address for the flow tag computed in the last step. The flow tag address is an address in both the approved list and the disapproved list at which the flow tag may be entered. If a flow tag appears on the approved list or the disapproved list at its corresponding flow tag address then the flow tag is pre-approved or pre-disapproved, respectively. If a flow tag does not appear on the approved list or the disapproved list but is approved or disapproved after comparing the flow tag to the rules contained in the database then the flow tag is stored on the approved list if approved or on the disapproved list if not approved. A flow tag address is useful for speeding up the search process. Instead of searching a large list to see if a flow tag is present, the flow tag address tells the information processing network where the flow tag may be found if at all.

Since the IP packet is used to compute the flow tag and has information in common with all IP packets of that flow then the same flow tag will be generated for each IP packet in the flow.

An IP packet of one flow may contain information in common with an IP packet of a different flow. Therefore, the flow tags may be the same for IP packets of different flows.

The flow tag address in the preferred embodiment of the present method is fourteen bits long. Fourteen equations are used to compute the flow tag address. Other suitable address lengths and equations may be used. The flow tag address is computed by performing a bitwise exclusive- or operation of certain bits of the flow tag, where the flow tag address bits are represented by $(f_0, f_1, \ldots, f_n)$, where the flow tag bits from the IP source address are represented by $(s_0, s_1, \ldots, s_n)$, where the flow tag bits from the IP destination address are represented by $(d_0, d_1, \ldots, d_n)$, where the flow tag bits from the IP protocol are represented by $(p_0, p_1, \ldots, p_n)$, and where the upper layer protocol header are represented by $(h_0, h_1, \ldots, h_n)$. If there is no upper layer protocol header in the IP data packet then each bit location in $(h_0, h_1, \ldots, h_n)$ will be a zero. Each bit of the flow tag address may be computed as follows, where x indicates an exclusive-or operation:

$f_0 = s_0 x s_{14} x s_{28} x d_{13} x d_{27} x h_0 x h_{16};$ $f_1 = s_1 x s_{15} x s_{29} x d_{12} x d_{26} x h_1 x h_{17};$ $f_2 = s_2 x s_{16} x s_{30} x d_{11} x d_{25} x h_2 x h_{18} x p_0;$ $f_3 = s_3 x s_{17} x d_{10} x d_{24} x h_3 x h_{19} x p_1;$ $f_4 = s_4 x s_{18} x d_9 x d_{23} x h_4 x h_{20} x p_2;$ $f_5 = s_5 x s_{19} x d_8 x d_{22} x h_5 x h_{21} x p_3;$ $f_6 = s_6 x s_{20} x d_7 x d_{21} x h_6 x h_{22} x h_{28} x p_4;$ $f_7 = s_7 x s_{21} x d_6 x d_{20} x h_7 x h_{23} x h_{29} x p_5;$ $f_8 = s_8 x s_{22} x d_5 x d_{19} x h_8 x h_{24} x h_{30} x p_6;$ $f_9 = s_9 x s_{23} x d_4 x d_{18} x h_9 x h_{25} x h_{31} x p_7;$ $f_{10} = s_{10} x s_{24} x d_3 x d_{17} x d_{31} x h_{10} x h_{26};$ $f_{11} = s_{11} x s_{25} x d_2 x d_{16} x d_{30} x h_{11} x h_{27};$ $f_{12} = s_{12} x s_{26} x d_1 x d_{15} x d_{29} x h_{12} x h_{14};$ and $f_{13} = s_{13} x s_{27} x d_0 x d_{14} x d_{28} x h_{13} x h_{15}.$ The flow tag address provides a mechanism for quickly identifying pre-approved and pre-disapproved flows.

Figure 5:
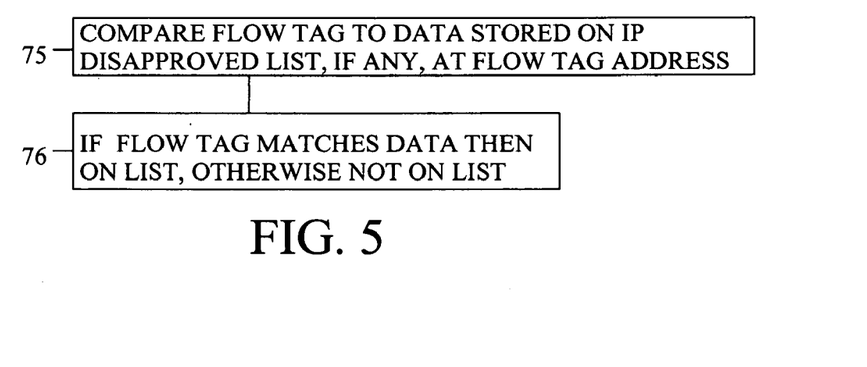
FIG. 5 is a list of steps for finding a flow tag on an IP disapproved list.

FIG. 5 is a list of steps for determining whether or not a flow tag is on the disapproved list. The first step 75 is comparing the flow tag to what is stored at the flow tag address in the disapproved list. The second step 76 is determining if the flow tag is on the disapproved list if a match occurred in the last step. Otherwise, determining that the flow tag is not on the disapproved list.

Figure 6:
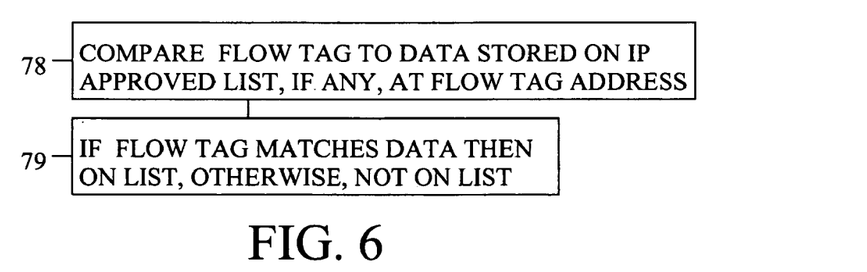
FIG. 6 is a list of steps for finding a flow tag on an IP approved list.
Figure 7:
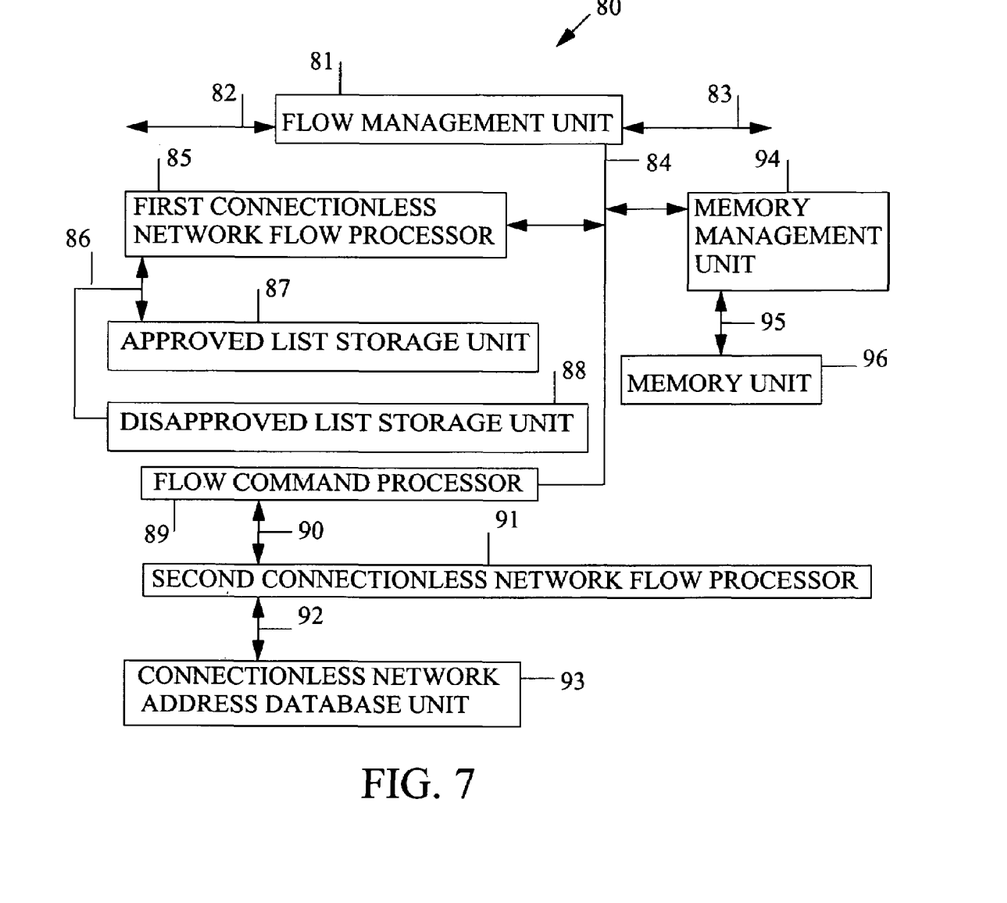
FIG. 7 is a schematic of the present invention.

FIG. 6 is a list of steps for determining whether or not a flow tag is on the approved list. The first step 78 is comparing the flow tag to what is stored at the flow tag address in the approved list. The second step 79 is determining if the flow tag is on the IP approved list if a match occurred in the last step. Otherwise, determining that the flow tag is not on the approved list FIG. 7 is a schematic of a device 80 for accessing an information processing network that implements the method described above. The device 80 includes a flow management unit 81, having a first input/output bus 82 for receiving a flow, having a second input/output bus 83 for transmitting the flow, and having a third input/output bus 84. A first connectionless network processor 85 is connected to the third input/output bus 84 of the flow management unit 81, and has an input/output bus 86. An approved list storage unit 87 is connected to the input/output bus 86 of the first connectionless network flow processor 85. A disapproved list storage unit 88 is connected to the input/output bus 86 of the first connectionless network flow processor 85. A flow command processor 89 is connected to the third input/output bus 84 of the flow management unit 81, and has an input/output bus 90. A second connectionless network flow processor 91 is connected to the input/output bus 90 of the flow command processor 89 and has an input/output bus 92. A connectionless network address database unit 93 is connected to the input/output bus 92 of the second connectionless network flow processor 91. A memory management unit 94 is connected to the third input/output bus 84 of the flow management unit 81 and has an input/output bus 95. A memory unit 96 is connected to the input/output bus 95 of the memory management unit 94.

What is claimed is:

1. A method of accessing an information processing network, comprising the steps of:
   a) initializing a database, an approved list, and a disapproved list, where the database contains rules for allowing and denying access to the information processing network, where the approved list includes approvals of connectionless network packets, and where the disapproved list includes disapprovals of connectionless network packets;
   b) receiving a connectionless network packet;
   c) computing a flow tag based on the connectionless network packet;
   d) discarding the connectionless network packet and returning to step (b) if the flow tag is on the disapproved list;
   e) allowing the connectionless network packet access to the information processing network and returning to step (b) if the flow tag is on the approved list;
   f) comparing the flow tag to the database if the flow tag is not on the approved list and is not on the disapproved list;
   g) discarding the connectionless network packet, adding the flow tag to the disapproved list, and returning to step (b) if the database rejects the flow tag; and h) allowing the connectionless network packet access to the information processing network, adding the flow tag to the approved list, and returning to step (b) if the database accepts the flow tag.

2. The method of claim 1, wherein said step of computing a flow tag is comprised of the steps of:
   a) extracting from the connectionless network packet a user-definable number of bits from a connectionless network source address, a connectionless network destination address, a connectionless network protocol, an upper layer protocol header if included in the connectionless network packet, and application layer data;
   b) substituting all zeros for the upper layer protocol layer if none is included in the connectionless network packet;
   c) setting a user-definable number and location of bits in the result of the last step to zero; and
   d) computing a flow tag address.

3. The method of claim 2, where said step of computing a flow tag address is comprised of the steps of:
   a) setting a zeroth bit of the flow tag address to $f_0 = s_0 x s_{14} x s_{28} x d_{13} x d_{27} x h_0 x h_{16}$, where x is a bitwise exclusive-or operation, $f_i$ is the ith bit of the flow tag address, where $s_i$ is the ith bit of a connectionless network source address, where $d_i$ is the ith bit of a connectionless network destination address, where $p_i$ is the ith bit of a connectionless network protocol, and where $h_i$ is the ith bit of the upper layer protocol header, and;
   b) setting a first bit of the flow tag address to $f_1 = s_1 x s_{15} x s_{29} x d_{12} x d_{26} x h_1 x h_{17}$;
   c) setting a second bit of the flow tag address to $f_2 = s_2 x s_{16} x s_{30} x d_{11} x d_{25} x h_2 x h_{18} x p_0$;
   d) setting a third bit of the flow tag address to $f_3 = {}_3 x s_{17} x s_{31} x d_{10} x d_{24} x h_3 x h_{19} x p_1$;
   e) setting a fourth bit of the flow tag address to $f_4 = s_4 x s_{18} x d_9 x d_{23} x h_4 x h_{20} x p_2$;
   f) setting a fifth bit of the flow tag address to $f_5 = s_5 x s_{19} x d_8 x d_{22} x h_5 x h_{21} x p_3$;
   g) setting a sixth bit of the flow tag address to $f_6 = s_6 x s_{20} x d_7 x d_{21} x h_6 x h_{22} x h_{28} x p_4$;
   h) setting a seventh bit of the flow tag address to $f_7 = s_7 x s_{21} x d_6 x d_{20} x h_7 x h_{23} x h_{29} x p_5$;
   i) setting a eighth bit of the flow tag address to $f_8 = s_8 x s_{22} x d_5 x d_{19} x h_8 x h_{24} x h_{30} x p_6$;
   j) setting a ninth bit of the flow tag address to $f_9 = s_{23} x d_4 x d_{18} x h_9 x h_{25} x h_{31} x p_7$;
   k) setting a tenth bit of the flow tag address to $f_{10} = s_{10} x s_{24} x d_3 x d_{17} x d_{31} x h_{10} x h_{26}$;
   l) setting a eleventh bit of the flow tag address to $f_{11} = s_{11} x s_{25} x d_2 x d_{16} x d_{30} x h_{11} x h_{27}$;
   m) setting a twelfth bit of the flow tag address to $f_{12} = s_{12} x s_{26} x d_1 x d_{15} x d_{29} x h_{12} x h_{14}$; and
   n) setting a thirteenth bit of the flow tag address to $f_{13} = s_{13} x s_{27} x d_0 x d_{14} x d_{28} x h_{13} x h_{15}$.

4. The method claim 1, wherein the step of discarding the connectionless network packet, adding the flow tag to the disapproved list, and returning to step (b) if the database rejects the flow tag is comprised of the steps of:
   a) comparing the flow tag to any data stored on the disapproved list at the flow tag address;
   b) determining that the flow tag is on the disapproved list if a match occurred in the last step;
   c) discarding the connectionless network packet;
   d) adding the flow tag to the disapproved list; and
   e) returning to step (b).

5. The method claim 1, wherein the step of allowing the connectionless network packet access to the information processing network, adding the flow tag to the approved list, and returning to step (b) if the database accepts the flow tag is comprised of the steps of:
   a) comparing the flow tag to any data stored on the approved list at the flow tag address;
   b) determining that the flow tag is on the approved list if a match occurred in the last step;
   c) allowing the connectionless network packet access to the information processing network;
   d) adding the flow tag to the approved list; and
   e) returning to step (b).

6. The method of claim 1, further including the step of recording all allowances of access to the information processing network and recording all discarded connectionless network packets.

7. The method of claim 6, further including the step of alerting a system administrator if the number of discarded connectionless network packets exceed a user-definable threshold.

8. The method of claim 6, further including the step of alerting a system administrator if the number of discarded connectionless network packets exceed a user-definable threshold within a user-definable span of time.

9. The method claim 3, wherein the step of discarding the connectionless network packet, adding the flow tag to the disapproved list, and returning to step (b) if the database rejects the flow tag is comprised of the steps of:
   a) comparing the flow tag to any data stored on the disapproved list at the flow tag address;
   b) determining that the flow tag is on the disapproved list if a match occurred in the last step;
   c) discarding the connectionless network packet;
   d) adding the flow tag to the disapproved list; and
   e) returning to step (b).

10. The method claim 9, wherein the step of allowing the connectionless network packet access to the information processing network, adding the flow tag to the approved list, and returning to step (b) if the database accepts the flow tag is comprised of the steps of:
    a) comparing the flow tag to any data stored on the approved list at the flow tag address;
    b) determining that the flow tag is on the approved list if a match occurred in the last step;
    c) allowing the connectionless network packet access to the information processing network;
    d) adding the flow tag to the approved list; and
    e) returning to step (b).

11. The method of claim 10, further including the step of recording all allowances of access to the information processing network and recording all discarded connectionless network packets.

12. The method of claim 11, further including the step of alerting a system administrator if the number of discarded connectionless network packets exceed a user-definable threshold.

13. The method of claim 11, further including the step of alerting a system administrator if the number of discarded connectionless network packets exceed a user-definable threshold within a user-definable span of time.

14. A method of accessing an information processing network, comprising the steps of:
  a) initializing a database, an approved list, and a disapproved list, where the database contains rules for allowing and denying access to the information processing network, where the approved list includes approvals of IP packets, and where the disapproved list includes disapprovals of IP packets;
  b) receiving an IP packet;
  c) computing a flow tag based on the IP packet;
  d) discarding the IP packet and returning to step (b) if the flow tag is on the disapproved list;
  e) allowing the IP packet access to the information processing network and returning to step (b) if the flow tag is on the approved list;
  f) comparing the flow tag to the database if the flow tag is not on the approved list and is not on the disapproved list;
  g) discarding the IP packet, adding the flow tag to the disapproved list, and returning to step (b) if the database rejects the flow tag; and
  h) allowing the IP packet access to the information processing network, adding the flow tag to the approved list, and returning to step (b) if the database accepts the flow tag.

15. The method of claim 14, wherein said step of computing a flow tag is comprised of the steps of:
  a) extracting from the IP packet a user-definable number of bits from a IP source address, a IP destination address, a IP protocol, an upper layer protocol header if included in the IP packet, and data;
  b) substituting all zeros for the upper layer protocol layer if none is included in the IP packet;
  c) setting a user-definable number and location of bits in the result of the last step to zero; and
  d) computing a flow tag address.

16. The method of claim 15, where said step of computing a flow tag address is comprised of the steps of:
  a) setting a zeroth bit of the flow tag address to $f_0=s_0 x s_{14} x s_{28} x d_{13} x d_{27} x h_0 x h_{16}$, where x is a bitwise exclusive-or operation, $f_i$ is the ith bit of the flow tag address, where $s_i$ is the ith bit of a IP source address, where $d_i$ is the ith bit of a IP destination address, where $p_i$ is the ith bit of a IP protocol, and where $h_i$ is the ith bit of the upper layer protocol header, and;
  b) setting a first bit of the flow tag address to $f_1=s_1 x s_{15} x s_{29} x d_{12} x d_{26} x h_1 x h_{17}$;
  c) setting a second bit of the flow tag address to $f_2=s_2 x s_{16} x s_{30} x d_{11} x d_{25} x h_2 x h_{18} x p_0$;
  d) setting a third bit of the flow tag address to $f_3=s_3 x s_{17} x s_{31} x d_{10} x d_{24} x h_3 x h_{19} x p_1$;
  e) setting a fourth bit of the flow tag address to $f_4=s_4 x s_{18} x d_9 x d_{23} x h_4 x h_{20} x p_2$;
  f) setting a fifth bit of the flow tag address to $f_5=s_5 x s_{19} x d_8 x d_{22} x h_5 x h_{21} x p_3$;
  g) setting a sixth bit of the flow tag address to $f_6=s_6 x s_{20} x d_7 x d_{21} x h_6 x h_{22} x h_{28} x p_4$;
  h) setting a seventh bit of the flow tag address to $f_7=s_7 x s_{21} x d_6 x d_{20} x h_7 x h_{23} x h_{29} x p_5$;
  i) setting a eighth bit of the flow tag address to $f_8=s_8 x s_{22} x d_5 x d_{19} x h_8 x h_{24} x h_{30} x p_6$;
  j) setting a ninth bit of the flow tag address to $f_9=s_9 x s_{23} x d_4 x d_{18} x h_9 x h_{25} x h_{31} x p_7$;
  k) setting a tenth bit of the flow tag address to $f_{10}=s_{10} x s_{24} x d_3 x d_{17} x d_{31} x h_{10} x h_{26}$;
  l) setting a eleventh bit of the flow tag address to $f_{11}=s_{11} x s_{25} x d_2 x d_{16} x d_{30} x h_{11} x h_{27}$;
  m) setting a twelfth bit of the flow tag address to $f_{12}=s_{12} x s_{26} x d_1 x d_{15} x d_{29} x h_{12} x h_{14}$; and
  n) setting a thirteenth bit of the flow tag address to $f_{13}=s_{13} x s_{27} x d_0 x d_{14} x d_{28} x h_{13} x h_{15}$.

17. The method claim 14, wherein the step of discarding the IP packet, adding the flow tag to the disapproved list, and returning to step (b) if the database rejects the flow tag is comprised of the steps of:
  a) comparing the flow tag to any data stored on the disapproved list at the flow tag address;
  b) determining that the flow tag is on the disapproved list if a match occurred in the last step;
  c) discarding the IP packet;
  d) adding the flow tag to the disapproved list; and
  e) returning to step (b).

18. The method claim 14, wherein the step of allowing the IP packet access to the information processing network, adding the flow tag to the approved list, and returning to step (b) if the database accepts the flow tag is comprised of the steps of:
  a) comparing the flow tag to any data stored on the approved list at the flow tag address;
  b) determining that the flow tag is on the approved list if a match occurred in the last step;
  c) allowing the IP packet access to the information processing network;
  d) adding the flow tag to the approved list; and
  e) returning to step (b).

19. The method of claim 14, further including the step of recording all allowances of access to the information processing network and recording all discarded IP packets.

20. The method of claim 19, further including the step of alerting a system administrator if the number of discarded IP packets exceed a user-definable threshold.

21. The method of claim 19, further including the step of alerting a system administrator if the number of discarded IP packets exceed a user-definable threshold within a user-definable span of time.

22. The method claim 16, wherein the step of discarding the IP packet, adding the flow tag to the disapproved list, and returning to step (b) if the database rejects the flow tag is comprised of the steps of:
  a) comparing the flow tag to any data stored on the disapproved list at the flow tag address;
  b) determining that the flow tag is on the disapproved list if a match occurred in the last step;
  c) discarding the IP packet;
  d) adding the flow tag to the disapproved list; and
  e) returning to step (b).

23. The method claim 22, wherein the step of allowing the IP packet access to the information processing network, adding the flow tag to the approved list, and returning to step (b) if the database accepts the flow tag is comprised of the steps of:
  a) comparing the flow tag to any data stored on the approved list at the flow tag address;
  b) determining that the flow tag is on the approved list if a match occurred in the last step;
  c) allowing the IP packet access to the information processing network;
  d) adding the flow tag to the approved list; and
  e) returning to step (b).

24. The method of claim 23, further including the step of recording all allowances of access to the information processing network and recording all discarded IP packets.

25. The method of claim 24, further including the step of alerting a system administrator if the number of discarded IP packets exceed a user-definable threshold.

26. The method of claim 24, further including the step of alerting a system administrator if the number of discarded IP packets exceed a user-definable threshold within a user-definable span of time.

* * * * *